July 11, 1939.  S. S. GREEN  2,166,003
POLYPHASE METER CASE
Filed Feb. 11, 1937   2 Sheets-Sheet 1
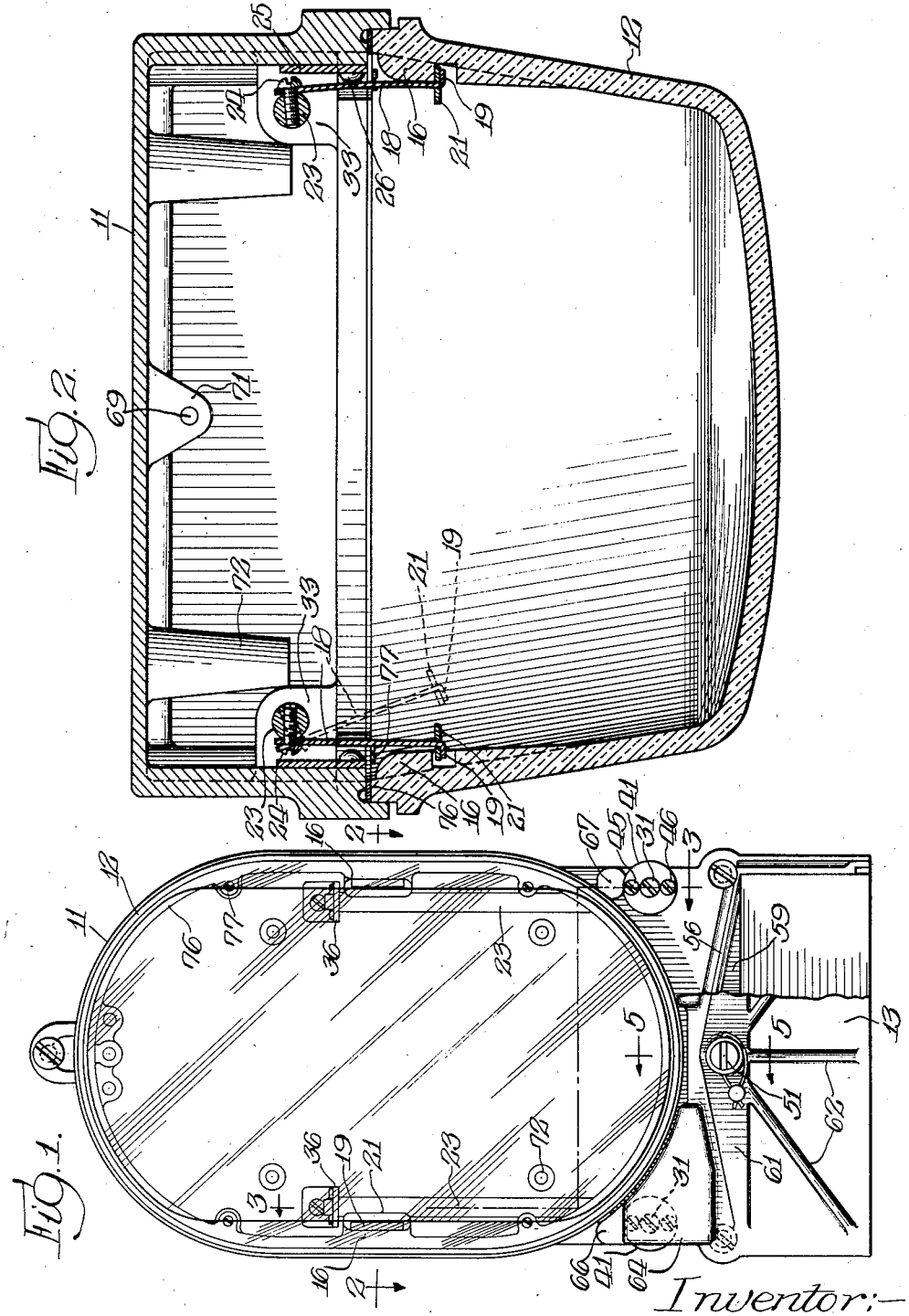
Inventor:—
Stanley S. Green,
By Louis Robertson Atty.

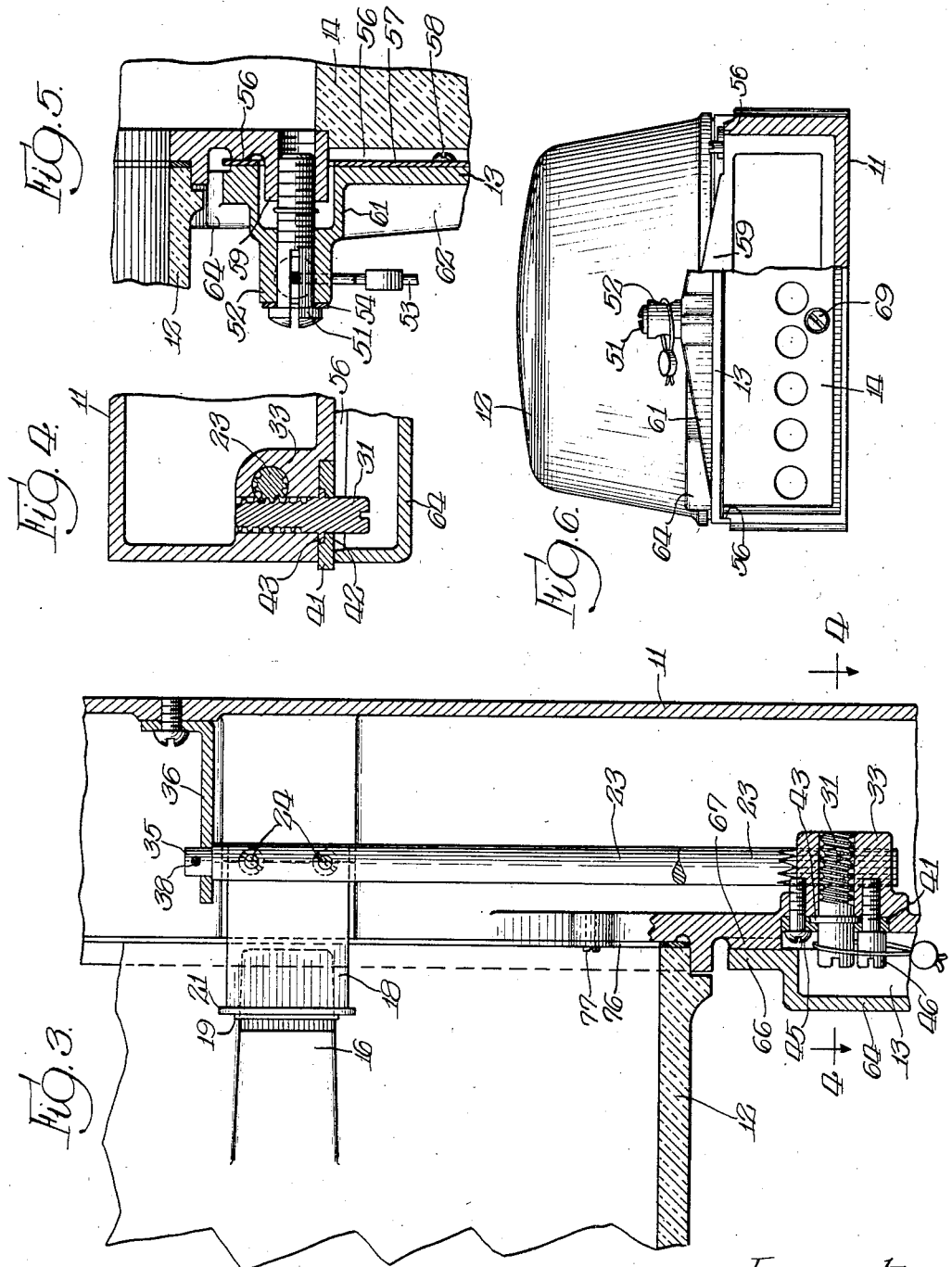
July 11, 1939.  S. S. GREEN  2,166,003
POLYPHASE METER CASE
Filed Feb. 11, 1937  2 Sheets-Sheet 2
Inventor:
Stanley S. Green,
By Louis Robertson Atty.

Patented July 11, 1939

2,166,003

UNITED STATES PATENT OFFICE 2,166,003

POLYPHASE METER CASE

Stanley S. Green, La Fayette, Ind., assignor to Duncan Electric Manufacturing Company, La Fayette, Ind., a corporation of Illinois Application February 11, 1937, Serial No. 125,211

13 Claims. (Cl. 171—34)

This invention relates to cases for watt-hour meters and more particularly to means for sealing said cases closed. It is of particular value in relation to a multi-element meter such as the large polyphase meters which have oblong covers.

The problem of properly securing oblong covers to the meter bases has long been troublesome and there have been many partial solutions to it. For many years it was a custom with oblong covers, which could not be secured in place by a twisting or screwing action, to secure the covers by a pair of studs extending through the cover with thumb screws on the outside thereof. This manner of securing was very unsatisfactory partly because of the relative ease with which people could work wires in through the holes in the covers adjacent the studs or at least destroy the sealing washers over said holes with the result that dust or other foreign matter would get into the meter. In some meters which avoided the cover holes the cover was provided with a metal rim which had securing lugs thereon, and an external linkage was provided for engaging these lugs and drawing the cover tightly onto the base. However, it is rather difficult to secure a rim properly on an oblong cover, and, furthermore, the external securing means was disadvantageous because it was so subject to injury by people attempting to tamper with the meter.

One attempt to avoid both the metal rim and the cover holes involved a strap extending across the meter cover and drawn tight by screw means. This form was quite inconvenient in use, however, and furthermore was subject to the same objection of having external securing means which were easily damaged. Another attempt to avoid both the cover holes and the permanently secured metal rim involved a split ring seal which was in itself a metal rim. It was relatively inconvenient and its gain except in neatness was questionable. The split ring itself comprised external securing means which could be damaged by tamperers. Furthermore, this split ring seal was not satisfactory with the common flat sided oval covers but required that these flat sides be bulged out somewhat so that the split ring would be drawn tightly against the cover at all points.

The present invention has solved the problem by providing a glass cover having lugs formed integrally on the inside thereof and providing means within the meter case for engaging these lugs and drawing the cover tight. The securing means within the case are operated by screw means accessible from the outside of the meter base preferably positioned under the terminal chamber cover which is especially constructed to cover such screw means and in turn to be secured by a single screw adapted to be sealed by the usual lead sealing slug.

The objects of the invention are for the most part apparent from the foregoing introduction, but in summary it may be stated that the objects are to provide a satisfactory securing arrangement for an oblong meter cover preferably one which has no securing parts exposed on the outside of the meter case and which is convenient to operate and to seal closed.

Further objects and advantages of the invention will be apparent from the following description and from the drawings, in which:

Fig. 1 is a front elevation of the meter case, one portion of the terminal chamber cover plate being broken away for the sake of clarity.

Fig. 2 is a horizontal sectional view substantially along the line 2—2 of Fig. 1.

Fig. 3 is an interrupted vertical sectional view substantially along the irregular line 3—3 of Fig. 1.

Fig. 4 is a fragmentary sectional view substantially along the line 4—4 of Fig. 3.

Fig. 5 is a fragmentary sectional view substantially along the line 5—5 of Fig. 1; and Fig. 6 is a bottom end and partly sectional view of the structure shown in Fig. 1.

Although this invention may take numerous forms, only one has been chosen for the purpose of illustration. In this form the invention is embodied in a meter case which includes a base 11, a glass cover 12 for the meter chamber, and a cover plate 13 for the terminal chamber, as the lower part of the base 11 is called. A connection block 14 is commonly provided within the terminal chamber to which the wires from the conduit, not shown, are connected. As seen best in Fig. 2, the cover 12 is provided with integral lugs 16 on the inside thereof and on opposite sides thereof, the positions being seen best in Fig. 1. These lugs 16 are engaged by pull straps 18 having outwardly turned flanges 19 at their outer ends and preferably provided with fiber washers 21 to prevent injury to the glass. The pull straps 18 are operated by rotatably mounted rods 23 to which they are secured in a tangent position by screws 24. As seen in dotted lines at the left-hand side of Fig. 2, rotating the rods 23 in one direction will turn the pull straps 18 to a position entirely out of engagement with the cover 12. When both of the pull straps 18 are moved to this disengaged position the cover 12 may be removed. When it has been replaced it may be secured by turning the rods 23 in the opposite, or engaging, direction. As the rods 23 are first rotated in the engaging direction, the pull straps move from the position shown in dotted lines in Fig. 2 to the position shown in full lines at the left, at which time the pull strap is in a position ready to engage the lug 16 on the cover but has not yet been drawn home. Continued rotation of the rod 23 not only urges the pull strap 18 in a rotative direction to press it resiliently but more firmly against the cover, but also draws the pull strap longitudinally toward the base, thus drawing the cover tight. It will be noted that the simple rotative rod 23 produces a double movement in the pull strap 18, first swinging it to a position of engagement with the cover and then drawing it longitudinally to tighten the cover. A hardened steel plate 25 may be secured adjacent pull strap 18 by pins 26 driven into base 11 to protect said strap and the screws 24 from tamperers drilling through the base 11.

Each of the rods 23 is rotated by means of a worm screw 31 which is positioned as seen best in Fig. 1 normally being housed under the terminal chamber cover plate 13. Each worm screw 31 and one end of the corresponding rod 23 are rotatably carried by a boss 33 formed integrally with the base 11.

In assembling these parts the rod 23 is first inserted upwardly through the boss 33 and its reduced upper end 35 is inserted through a bracket 36 secured to the base. A cotter pin 38 or other securing means is then applied. The pull strap 18 is then secured to the rod 23. Next the worm screw 31 is screwed into the boss 33 from the front thereof, the rod 23 of course being turned to such a position as seen in Fig. 4, for example, so that its teeth will be engaged by the worm thread. The worm screw 31 is then secured in place by applying a washer 41 over it, the washer 41 having an annular flange 42 under which an annular flange 43 of the worm screw 31 rotates. The washer 41 is held down by a screw 45 and a screw 46, as seen best in Fig. 3. The screw 46 and the worm screw 31 are desirably provided with holes suitable for threading the sealing wire therethrough in case it is desired to provide seals for the cover 12 in addition to or instead of the single seal described in the next paragraph.

After the main cover 12 has been drawn tight by turning the worm screws 31 as above described and assuming that the desired connections have been made through the connection block 14, the terminal chamber cover plate 13 is applied to the terminal chamber. This terminal chamber cover plate is secured in place by a single screw 51, which is inserted through a bushing 52 formed integrally on cover plate 13 and screws into a formation 59 on the front side of the base 11, as seen best in Fig. 5. Screw 51 is slotted, as seen in Fig. 5, to form a passage for the sealing wire 53. Since the slot is also used as a screw-driver slot, a washer 54 may be provided to keep the screw 51 from spreading.

It is desirable that this cover plate form a seal with the front of the base 11 above and at the sides of the terminal chamber so as to prevent water from running into said terminal chamber, it being understood that this meter case is adapted for outdoor use. To this end the front of the housing is provided with a raised rim 56 which may be milled or ground to present a flat top surface if desired. The cover plate 13 is provided with a gasket 57 which may be secured to the cover plate as by screws 58 and which is adapted to engage the raised rim 56.

It will be noted from Figs. 5 and 6 that in order to provide a portion of the front side of the base of sufficient strength for screwing the screw 51 thereto firmly, the base is cast with a relatively heavy and tapered raised portion 59 which, as seen best in Fig. 5, extends forwardly through a hole in the gasket 57. The cover is cast with a corresponding raised portion 61 which not only makes room for the raised portion 59 of the base but also greatly stiffens the cover. The cover is further stiffened by ribs 62 as seen in Fig. 1.

In order that the cover plate 13 may seal the gasket 57 firmly against the sealing rim 56 throughout the length of this sealing rim, the upward extensions 64 of the cover plate 13 are so fitted as to be sprung slightly when the screw 51 is tightened. As the screw 51 is tightened the portions of the gasket farthest therefrom strike the sealing rim 56 first, and as the screw 51 is tightened to force the portion of the gasket adjacent thereto against the sealing rim the sealing pressure along the remainder of the sealing rim is maintained or increased. As will be observed from Fig. 1, the top of the sealing rim 56 is slanted downwardly from the middle so that water will drain therefrom.

At the upper end of each upward extension 64 there is provided a contact lug 66 which engages a cooperating contact boss 67 formed integrally with the base 11. The contact lugs 66 may be milled to the same plane as the face of the gasket 57 and the contact bosses 67 may be milled down until they project just the desired amount beyond the plane of the sealing rim 56, say about a thirty-second of an inch. It will be observed from Figs. 1 and 3 that the upward extensions 64 of the cover plate 13 are for the most part raised and hollow so as to form a housing for the worm screw 31 and its securing screws 45 and 46 and also for the sealing wire which may be passed through the screws 31 and 46 if desired, as seen in Fig. 3.

Although the connection block 14 is not in itself a novel part of this invention it should be noted that it is secured within the terminal chamber portion of the base 11 by a screw 69 seen in Fig. 6 passing therethrough and screwing into a lug 71, seen in Fig. 2, which is cast integrally with the base 11. The posts 72, also cast integrally with the base, are supporting posts for the meter element.

The gasket for the main glass cover has heretofore given a great deal of trouble. It has been the custom to secure it to the cover as by providing it with lugs which slip under the rim applied to the cover. The gasket frequently came out if the cover was removed, and even if not injured caused considerable loss of time on the part of the meter service men in getting it properly reinserted. According to the present invention this vexatious difficulty has been removed by securing a sealing gasket 76 to the meter base by screws 77 as seen in Fig. 1.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

1. A meter case including a base and a glass cover, lugs formed integrally on the inside of said cover, and means within said case for engaging said lugs and drawing said cover tightly against said base, said means including a rotatably mounted rod and a pull strap mounted on one side of said rod and having one end adapted to engage one of said lugs whereby rotation of said rod first swings said pull strap into engagement with said lug and then draws said cover tight by said engagement.

2. A meter case including a base and a cover, lugs on the inside of said cover, and means within said case actively operated for engaging said lugs and drawing said cover tightly against said base with a non-rotative movement of the cover.

3. A meter case including a base and a cover, lugs on the inside of said cover, and means within said case for engaging said lugs and drawing said cover tightly against said base, said means including a rotatably mounted rod and a pull strap mounted on one side of said rod and having one end adapted to engage one of said lugs whereby rotation of said rod first swings said pull strap into engagement with said lug and then draws said cover tight by said engagement.

4. A meter case including a base and a glass cover, lugs formed integrally on the inside of said cover, and means within said case for engaging said lugs and drawing said cover tightly against said base, said means including a rotatably mounted rod, a pull strap mounted on one side of said rod and having one end adapted to engage one of said lugs whereby rotation of said rod first swings said pul strap into engagement with said lug and then draws said cover tight by said engagement, and means for rotating said rod comprising worm screw means drivingly associated with said rod and accessible from the outside of said case.

5. A meter case including a base and a glass cover, lugs formed integrally on the inside of said cover, and means within said case for engaging said lugs and drawing said cover tightly against said base, said means including a rotatably mounted rod, a pull strap mounted on one side of said rod and having one end adapted to engage one of said lugs whereby rotation of said rod first swings said pull strap into engagement with said lug and then draws said cover tight by said engagement, means for rotating said rod comprising worm screw means drivingly associated with said rod and accessible from the outside of said case, and a terminal chamber cover adapted to cover and prevent access to said worm screw means.

6. A meter case including a base and a glass cover, lugs formed integraly on the inside of said cover, and means within said case for engaging said lugs and drawing said cover tightly against said base, said means including a rotatably mounted rod, a pull strap mounted on one side of said rod and having one end adapted to engage one of said lugs whereby rotation of said rod first swings said pull strap into engagement with said lug and then draws said cover tight by said engagement, means for rotating said rod comprising worm screw means drivingly associated with said rod and accessible from the outside of said case, and a terminal chamber cover having upward extensions thereon adapted to cover and prevent access to said worm screw means, said terminal chamber cover being secured by a single screw and forming a tight sealing contact with a sealing rim on the base extending along the top and down the sides of said terminal chamber.

7. A meter case including a base having a meter chamber and a terminal chamber, a cover for said meter chamber, a cover for said terminal chamber, and means for drawing said meter chamber cover tight against said base and for securing said meter chamber cover located entirely within the meter case and accessible for operation only when said terminal chamber cover is removed.

8. A meter case including a base having a terminal chamber and a continuous narrow machined sealing rim above and at the sides of said terminal chamber, a cover for said terminal chamber, a gasket between the cover and the sealing rim, and a single screw for securing said cover firmly against said rim.

9. A meter case including a base having a terminal chamber and a sealing rim above and at the sides of said terminal chamber, a cover for said terminal chamber, a single screw for securing said cover firmly against said rim, and means for causing said single screw to exert a substantial sealing pressure throughout the length of said rim.

10. A meter case including a base having a terminal chamber and a sealing rim above and at the sides of said terminal chamber, a cover for said terminal chamber, a single screw for securing said cover firmly against said rim, a hollow rib formed on said cover for stiffening it, and a formation on said base extending into said rib and forming a relatively sturdy member for receiving said screw.

11. A meter case including a base, a cover having securing formations rigidly positioned on the inside thereof, and securing means within said base for coacting with said formations to secure said cover tightly to said base, said base having a flange extending outwardly around the rim of said cover, said rim being formed entirely of glass as an integral part of said cover.

12. A meter case including a base and a glass cover, lugs formed integrally on the inside of said cover, means within said case for engaging said lugs and drawing said cover tightly against said base, a gasket secured to said base for forming a water tight seal between it and the cover, and a flange formed on the base and extending outwardly and forwardly therefrom beyond the edge of the glass cover to provide protection against tampering when the cover is in place and to furnish some protection for the gasket when the cover is removed.

13. A meter case including a base, a cover having isolated integral securing formations thereon, and securing means housed entirely within the meter case for coacting with said formations to secure said cover tightly to said base, said base having a flange extending outwardly around the rim of said cover, and said rim being formed entirely of glass as an integral part of said cover.

STANLEY S. GREEN.